(12) United States Patent
Gaus et al.

(10) Patent No.: US 6,527,327 B2
(45) Date of Patent: Mar. 4, 2003

(54) FOOT-DEPOSITING ARRANGEMENT

(75) Inventors: Hermann Gaus, Stuttgart (DE); Jürgen Weissinger, Bissingen (DE); Hermann Weller, Bretzfeld (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/008,775

(22) Filed: Nov. 13, 2001

(65) Prior Publication Data

US 2002/0093215 A1 Jul. 18, 2002

(30) Foreign Application Priority Data

Nov. 14, 2000  (DE) ......................... 100 56 412

(51) Int. Cl.⁷ .................................. B60N 3/06
(52) U.S. Cl. .................... 296/75; 297/423.44
(58) Field of Search ............... 296/75, 65.13; 52/244; 114/363; 244/118.5; 74/562; 297/88, 423.44, 423.27, 423.26, 423.46, 423.19; 454/144

(56) References Cited

U.S. PATENT DOCUMENTS

| | | | | | |
|---|---|---|---|---|---|
| 167,095 A | * | 8/1875 | Goss | ................ | 296/75 |
| 802,995 A | * | 10/1905 | Knox | ................ | 296/75 |
| 807,831 A | * | 12/1905 | Leslie | ................ | 296/75 |
| 826,862 A | * | 7/1906 | Litter | ................ | 296/75 |
| 895,632 A | * | 8/1908 | Harris | ................ | 296/75 |
| 956,681 A | * | 5/1910 | Clarke | ................ | 296/75 |
| 1,301,426 A | * | 4/1919 | Garvey | ................ | 296/75 |
| 1,366,737 A | * | 1/1921 | Livermore | ................ | 296/75 |
| 1,487,495 A | * | 3/1924 | Germeten et al. | ................ | 296/75 |
| 1,525,864 A | * | 2/1925 | Hueseman | ................ | 296/75 |
| 1,812,703 A | * | 6/1931 | Knapp | ................ | 296/75 |
| 1,837,064 A | * | 12/1931 | Ostergard | ................ | 296/75 |
| 1,879,418 A | * | 9/1932 | Myatt | ................ | 296/75 |
| 2,032,157 A | * | 2/1936 | Dresser et al. | ................ | 296/75 |
| 2,202,857 A | * | 6/1940 | Jacobs | ................ | 296/75 |
| 2,283,600 A | * | 5/1942 | Dodson | ................ | 296/75 |
| 2,522,186 A | * | 9/1950 | McHenry | ................ | 296/75 |
| 2,944,439 A | * | 7/1960 | Dalton | ................ | 74/562 |
| 3,014,754 A | * | 12/1961 | Thurkow | ................ | 296/75 |
| 3,059,960 A | * | 10/1962 | Komorowski et al. | ......... | 296/75 |
| 4,635,999 A | * | 1/1987 | Simpson | ................ | 297/88 |
| 5,183,308 A | * | 2/1993 | Koga et al. | ................ | 296/75 |
| 5,294,180 A | * | 3/1994 | Grimm | ................ | 297/423.44 |
| 5,312,155 A | * | 5/1994 | Akima et al. | ................ | 297/423.27 |
| 5,447,359 A | * | 9/1995 | Asbjornsen et al. | ... | 297/423.26 |
| 5,482,346 A | * | 1/1996 | Lesourd | ................ | 296/75 |
| 5,584,535 A | * | 12/1996 | Jacobson et al. | ...... | 297/423.46 |
| 5,836,637 A | * | 11/1998 | Laginess et al. | ................ | 296/75 |
| 6,042,452 A | * | 3/2000 | Niebrugge | ................ | 297/423.44 |
| 6,241,301 B1 | * | 6/2001 | Speth et al. | ................ | 296/75 |
| 6,318,785 B1 | * | 11/2001 | Tousignant | ................ | 296/75 |
| 6,439,636 B1 | * | 8/2002 | Kuo | ................ | 296/65.13 |
| 2002/0058472 A1 | * | 5/2002 | Futschik et al. | ............ | 454/144 |
| 2002/0109389 A1 | * | 8/2002 | Satoh | ................ | 297/423.19 |

FOREIGN PATENT DOCUMENTS

| | | | |
|---|---|---|---|
| DE | 1 749 349 | | 7/1957 |
| EP | 0 539 444 | | 5/1993 |
| JP | 200-16137 | * | 1/2000 |

\* cited by examiner

*Primary Examiner*—Kiran Patel
(74) *Attorney, Agent, or Firm*—Kenyon & Kenyon

(57) ABSTRACT

A foot-depositing for a passenger sitting in a rear seat or in a front-passenger seat of a vehicle on which to place his feet, includes a frame which is arranged on the floor in front of the particular seat and supports a board, via an adjusting device, the adjusting device enabling the setting of a first board position, in which the board forms a ramp rising with increasing distance from the associated seat and is used for the passenger to place his feet. The adjusting device also enables the setting of a second board position, in which the board forms a ramp sloping away with increasing distance from the seat and is used for the passenger to place his calves.

21 Claims, 3 Drawing Sheets

FOOT-DEPOSITING ARRANGEMENT

FIELD OF THE INVENTION

The present invention relates to a foot-depositing arrangement on which a passenger sitting in a rear seat or in a front-passenger's seat of a vehicle may place his feet.

BACKGROUND INFORMATION

U.S. Pat. No. 5,183,308 describes a foot-depositing arrangement of this type having a frame, which is arranged on the floor in front of the particular seat and supports a board, via an adjusting device in the form of a linkage arrangement. The linkage arrangement enables the setting of a first board position, in which the board forms a ramp rising with increasing distance from the associated seat and on which the board is used for the passenger to place his feet. In the foot-depositing arrangement, the linkage arrangement also enables the setting of a further board position, in which the board runs essentially parallel to the floor, if the passenger does not require his feet to be supported.

European Published Patent Application No. 0 539 444 describes a foot-depositing arrangement, in which a linkage arrangement mounted on the seat supports a board arrangement. In a non-use position, the board arrangement extends approximately vertically downwardly below a front end of a seat cushion of the seat. The board arrangement includes a first support frame, which is mounted on the linkage, and a second supporting frame, which is mounted on the first supporting frame. Each supporting frame supports two boards, one of which is arranged closer to the seat and is designed so that it can be put upright on the associated supporting frame. In contrast to this, the other board is in each case fastened fixedly to the supporting frame. In a first use position, the board arrangement is pivoted forwardly and upwardly, in which case it forms an extension of the seat cushion. The board arrangement is then used as a support for the passenger's calves. In order to obtain a further extension of the seat cushion, the second supporting frame can be swung away forwardly from the supporting frame, as a result of which the passenger's legs can also be supported in the foot region.

German Utility Model No. 1 749 349 describes a container having a hinged cover, which is provided for accommodating car accessories. This container may also be designed with a triangular or wedge-shaped cross section, with the result that it can be used as a foot rest in the foot well of a motor vehicle.

It is an object of the present invention to provide a foot-depositing arrangement having an increased utility value and improved comfort.

SUMMARY

The above and other beneficial objects of the present invention are achieved by providing a foot-depositing arrangement as described herein.

The present invention is based on the concept of arranging a board with the aid of a suitable adjusting device in a foot well so that the board may be adjusted between a first board position, in which it is used as a foot rest, and a second board position, in which it is used as a calf rest. The board thereby provides a dual configuration in which it may be selectively arranged. This arrangement increases the utility value and at the same time the comfort of the foot-depositing arrangement.

The board may also be positioned with respect to its distance from the seat. This arrangement provides a simple option for adapting the foot rest and/or the calf rest to different requirements of the passengers.

A supporting frame, on which the board may be mounted by its lower side and on which the linkage arrangement may engage, may be configured as a storage box, the board forming the cover of the storage box. Diverse utensils, for example the passenger's shoes, may be accommodated in this storage box, e.g., in a crash-secure manner.

The storage box may be connected to the adjusting device so that the storage box may be removed from the adjusting device in a simple manner and may be connected to the adjusting device in a simple manner. In particular, the storage box may be configured as a portable case. This structural form enables the utility value of the foot-depositing arrangement according to the present invention to be additionally enhanced.

A further increase in comfort may be achieved by the board being configured so that it may be adjusted with respect to its length, as measured in the direction of the distance between the seat and frame.

The foot-depositing arrangement may also include a foot rest that may be activated in the second board position, in which the board is used as a calf rest. This feature also serves to increase the comfort.

To increase the comfort, driving arrangements may be provided which are suitable for at least one of the above-mentioned adjusting options and which may be operated by the passenger pushing a button.

A table board may be provided which may be adjusted by an adjusting arrangement between a non-use position, in which the table board is arranged in a space-saving manner on the foot-adjusting arrangement, and a use position, in which the table board is removed from the frame and is arranged in a usable manner for the passenger. In this manner, a table board is made available for the passenger when the need arises, as a result of which a further increase in comfort may be obtained.

The features mentioned above and those explained below may be used not only in the combination indicated in each case, but also in other combinations or on their own, without departing from the scope of the present invention.

Example embodiments of the present invention are illustrated in the Figures and are explained in greater detail in the following description.

DETAILED DESCRIPTION

Figure 1:
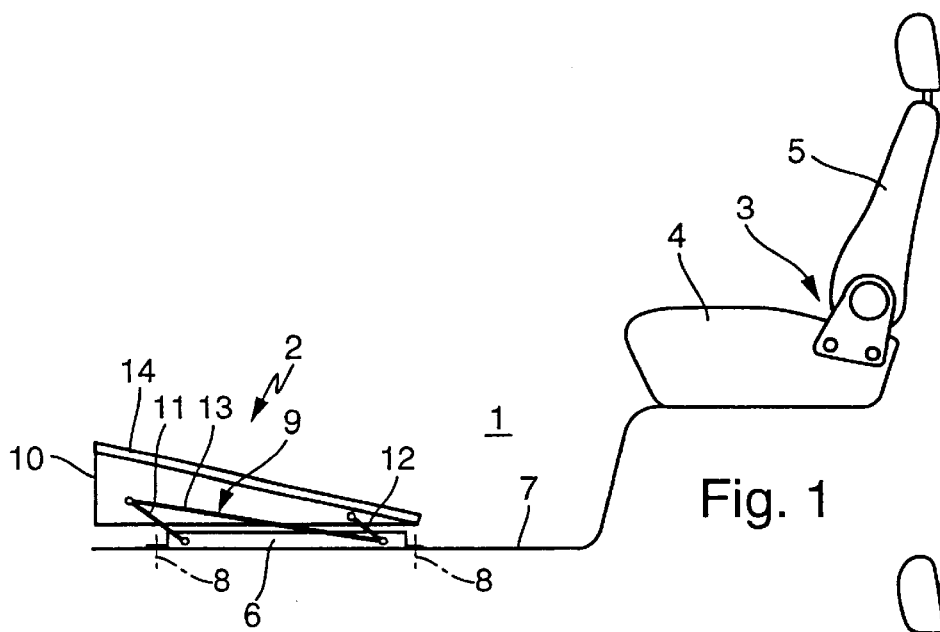
FIG. 1 is a side view of a foot-depositing arrangement according to the present invention arranged in the footwell in front of a vehicle seat in a first setting.

As illustrated in FIGS. 1 to 7, a foot-depositing arrangement 2 is arranged in the footwell 1 of a vehicle, e.g., a passenger vehicle, in front of a seat 3 of the vehicle. This seat 3 may be a rear seat or a front-passenger's seat that includes a seat cushion 4 and a backrest 5.

The foot-depositing arrangement 2 includes a frame 6, which, in the example embodiment, is secured to the floor 7 of the vehicle by screw connections 8, etc. A supporting frame 10 is mounted on this frame 6 via an adjusting device 9. The adjusting device 9 includes, for example, a linkage arrangement having three links, namely, a front link 11, which faces away from the seat 3, a rear link 12, which faces the seat 3, and a diagonal link 13. At least one of the-links 11 to 13 may be formed by a pair of links, the individual links of which are arranged one behind the other with respect to the viewing direction of the Figures. The links 11 to 13 are configured so that they may be adjusted in length, which may be obtained, for example, by a telescopic arrangement of the links 11 to 13. Furthermore, driving arrangements may be provided for the length adjustment of the links 11 to 13.

Instead of the linkage arrangement illustrated with length-adjustable links 11 to 13, the adjusting device 9 may be formed by any other adjusting device, e.g., the linkage or link arrangement.

The supporting frame 10 includes a board 14 on its upper side and includes a triangular or wedge-shaped cross-section with respect to a longitudinal direction of this board 14, with the longitudinal direction arranged in the plane of projection.

Figure 2:
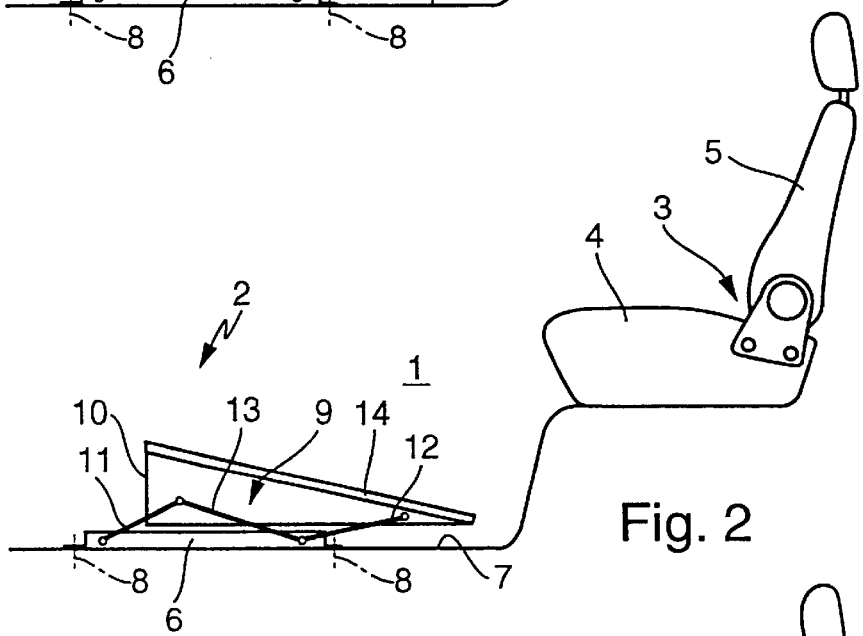
FIG. 2 is a side view of the foot-depositing arrangement illustrated in FIG. 1 in a second setting.

As illustrated in FIGS. 1 and 2, the board 14 assumes a first board position, in which the board 14 forms a ramp that rises with increasing distance from the associated seat 3. In this first board position, a passenger sitting in the seat 3 may place his feet on the board 14.

As illustrated in FIGS. 1 and 2, the adjusting device 9 enables the board 14 to be positioned longitudinally, as a result of which the distance between the board 14 and the seat 3 may be varied.

The adjusting device 9 also provides further degrees of freedom of the movement. For example, the inclination and/or the height of the ramp in the first board position may also be adjusted.

Figure 3:
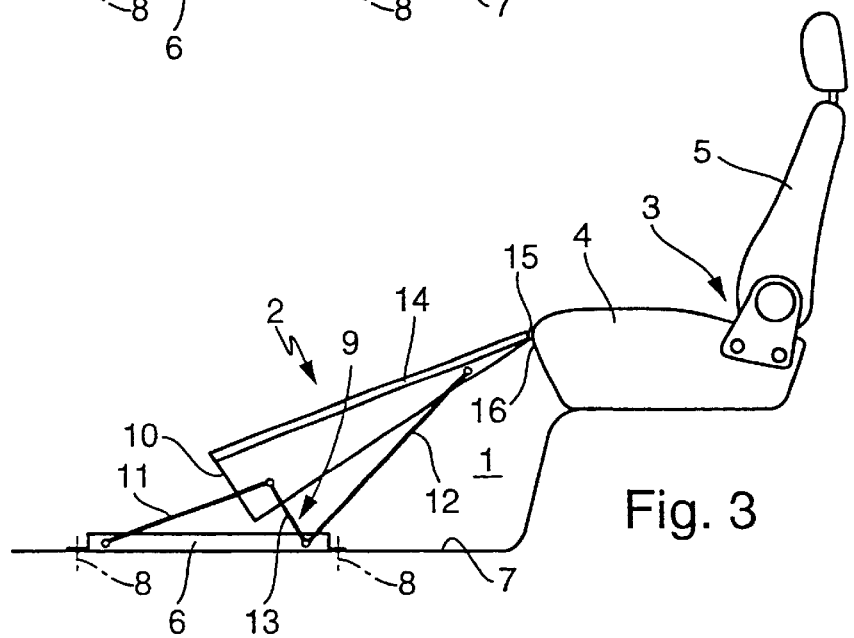
FIG. 3 is a side view of the foot-depositing arrangement illustrated in FIG. 1 in a third setting.
Figure 4:
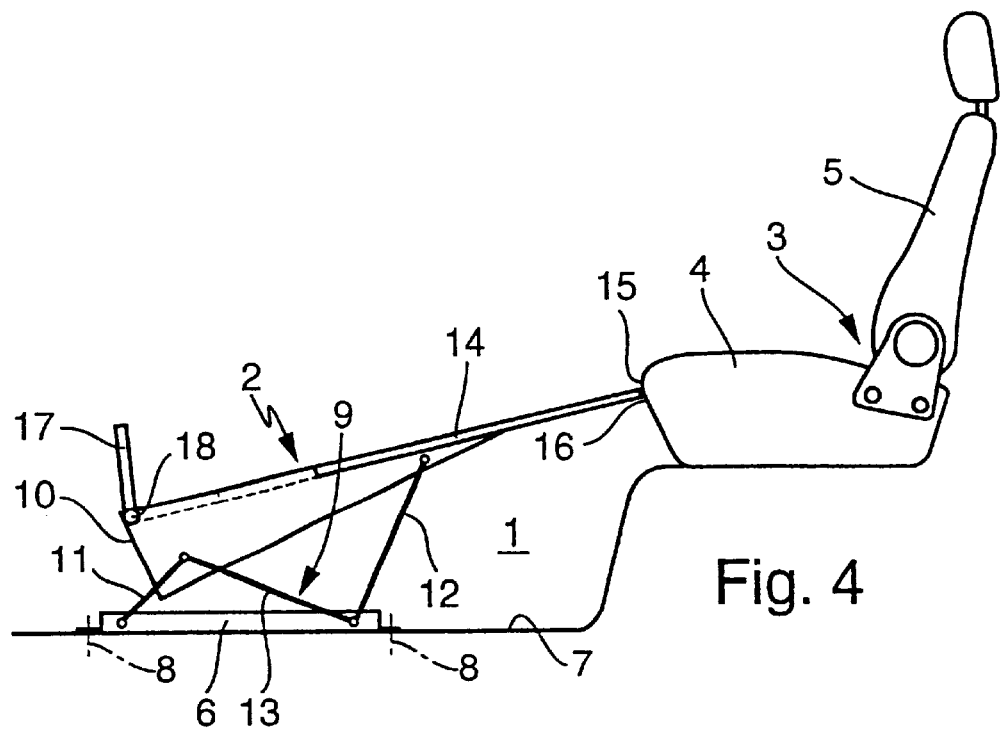
FIG. 4 is a side view of the foot-depositing arrangement illustrated in FIG. 1 in a fourth setting.

As illustrated in FIGS. 3 and 4, the adjusting device 9 also enables the setting of a second board position, in which the board 14 forms a ramp, but the ramp slopes away with increasing distance from the seat 3. In the second board position, the passenger may place his calves on the board 14. Also in the second board position, the adjusting device 9 may additionally enable the inclination and/or the height of the board 14 to be changed. It is also possible to lift up the supporting frame 10, at its front end that faces away from the seat 3, to such an extent that the board 14 extends substantially horizontally or in parallel to the floor 7.

FIG. 3 illustrates an example embodiment, in which the board 14 ends in its second board position with a transverse edge 15, which faces the seat 3, approximately flush with an upper transverse edge 16 of the seat cushion 4, which transverse edge faces the board 14. This arrangement provides for the passenger a particularly comfortable transition between the seat cushion 4 and the board 14 forming the calf rest.

In contrast to the position illustrated in FIG. 3, in the position illustrated in FIG. 4, the supporting frame 10 is at a relatively large distance from the seat 3. Nevertheless, an approximately flush transition between the board 14 and the seat cushion 4 may also be provided by the board 14 being configured so that it may be extended with respect to its longitudinal direction. In the example embodiment illustrated in FIG. 4, the board 14 is mounted on the supporting frame 10 so that it may be adjusted with respect to its longitudinal direction, so that it may be adjusted toward the seat cushion 4.

FIG. 4 also illustrates a further example embodiment of the foot-depositing arrangement 2, which includes a board that is divided with respect to it longitudinal direction. Accordingly, a first board part 17 is mounted on the supporting frame 10, in a section facing away from the seat 3, which board part is mounted on the supporting frame 10 so that it may pivot about a pivot axis 18 extending transversely with respect to the longitudinal direction of the board. In the second board position illustrated in FIG. 4, the first board part 17 may form a foot rest, which may be adjusted between a swung-down passive position and a swung-up active position. In the swung-down passive position, which is indicated in FIG. 4 by a dashed line, the first board part forms a planar extension of a second board part, which is mounted in a section of the supporting frame 10, which section faces the seat 3, and is denoted by 14. In the swung-up active 25 position, which is indicated in FIG. 4 by a solid line, the first board part 17 protrudes from the supporting frame 10 approximately perpendicularly with respect to the second board part 14. In this active position, the first board part 17 may be used as a foot rest.

In particular, the position of the foot-depositing arrangement 2 illustrated in FIG. 4 enables the passenger to comfortably recline, particularly if he adjusts the backrest 5 in a corresponding manner for this purpose.

Figure 5:
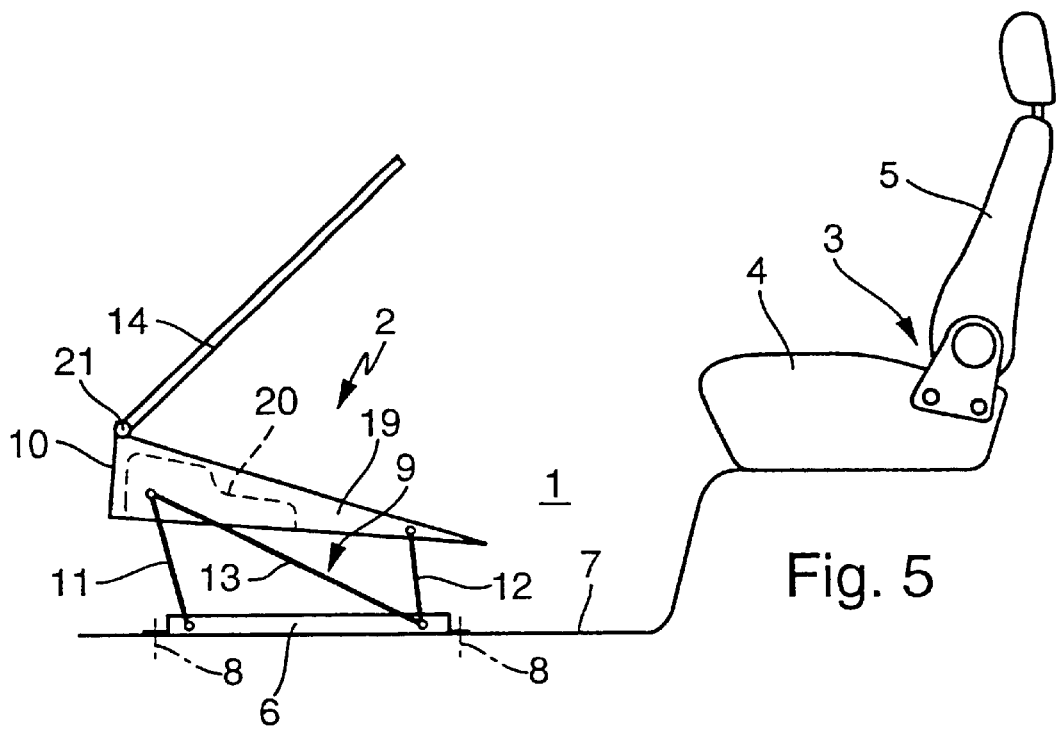
FIG. 5 is a side view of the foot-depositing arrangement illustrated in FIG. 1 in a fifth setting.

As illustrated in FIG. 5, the supporting frame 10 may be configured as a storage box, which contains in its interior a storage space 19 for diverse utensils, for example, shoes 20. In this case, the board 14 forms the cover of the storage box, for which purpose the board 14 is mounted on the supporting frame 10 so that it may pivot about a pivot axis 21 extending transversely with respect to the longitudinal direction of the board. Due to the wedge shape of the supporting frame 10, the storage space 19, and therefore the storage box formed by the supporting frame 10, also has a corresponding, wedge-shaped cross-section.

As illustrated in FIG. 5, the adjusting device 9 also enables the supporting frame 10, and therefore the board 14, to be adjusted in height. The storage box may, in particular, also be used in a position adjusted downwardly to the maximum.

The coupling between the supporting frame 10, which is configured as the storage box, and the adjusting device 9 may be configured so that the storage box 10 may be removed from the adjusting device 9 relatively easily by the particular passenger, i.e., the passenger may take the storage box 10 out of the foot-depositing arrangement 2 and may carry it with him outside the vehicle. In a corresponding manner, the fixing of the storage box 10 into the adjusting device 9, i.e., the insertion of the storage box 10 into the foot-depositing arrangement 2, may also be configured so that this procedure may be performed relatively simply by the particular passenger. These measures increase the utility value of the foot-depositing arrangement 2. The storage box 10 may be configured as a case, which is provided, for example, with suitable grips or handles.

Figure 6:
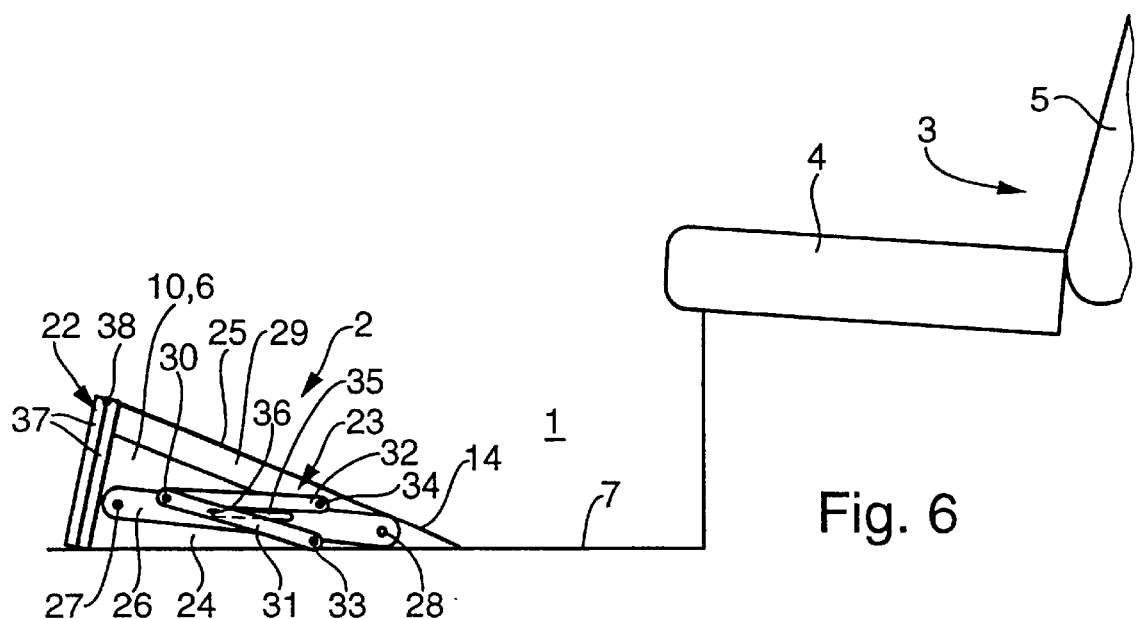
FIG. 6 is a side view of another example embodiment of a foot-depositing arrangement according to the present invention provided with a table board in a first setting.
Figure 7:
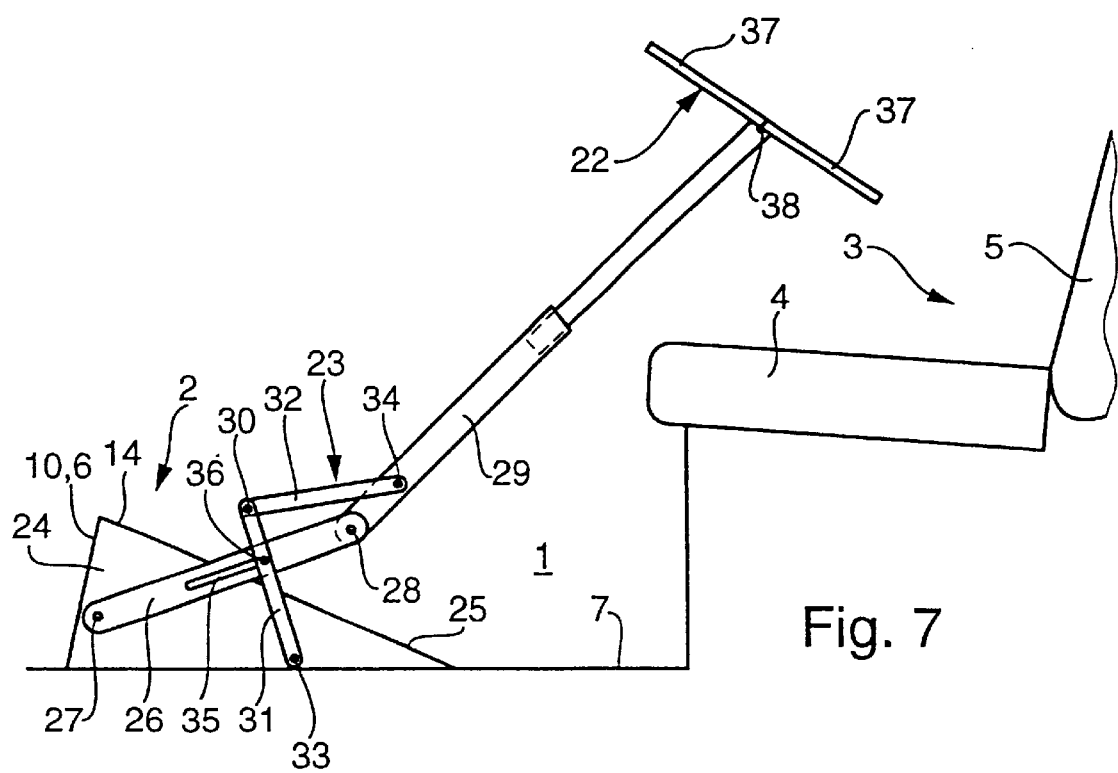
FIG. 7 is a side view of the foot-depositing arrangement illustrated in FIG. 6 in a second setting.

As illustrated in FIGS. 6 and 7, in one example embodiment, the foot-depositing arrangement 2 according to the present invention may be provided with a table board 22, which may be adjusted with the aid of an adjusting arrangement 23. This adjusting arrangement 23 may be formed, for example, by a scissors-type linkage enabling the table board 22 to be adjusted in a constrained manner in a predetermined path of movement.

The adjusting arrangement 23 is mounted on a triangular side cheek 24, which may be formed on the supporting frame 10 or on the frame 6 of the foot-depositing arrangement 2. An upper edge 25 of this side cheek 24 may extend parallel to, and in the viewing direction, congruently with the board 14 of the foot-depositing arrangement 2. This side cheek 24 may, if it forms part of the frame 6, laterally enclose the wedge-shaped supporting frame 10 and may laterally surround the adjusting device 9 for adjusting the foot-depositing board 14, as a result of which these parts of the foot-depositing arrangement 2 are concealed in FIGS. 6 and 7. The side cheek 24 and the adjusting arrangement 23 may be configured in pairs, in which case only those individual parts of these pairs that face the viewing direction. In addition, for illustration purposes, the adjusting device 23 is arranged on the side of the side cheek 24 that faces the viewing direction. However, an arrangement on the side facing away from the viewing direction is also possible if the side cheek 24 forms part of the frame 6.

If the side cheek 24 forms part of the supporting frame 10, for clarity the adjusting device 9 for adjusting the foot-depositing board 14 is not illustrated.

In the example embodiment illustrated, the adjusting arrangement 23 includes, in particular on each side, a first link 26, which is mounted at one end, at 27, on the side cheek 24 so that it may pivot about a transverse axis. At the other end, the first link 26 is connected in an articulated manner, at 28, to a second link 29. The table board 22 is mounted on this second link 29. The second link 29 as illustrated in FIG. 2 may, for example, be configured telescopically in order to obtain sufficient height adjustment for the table board 22. In another example embodiment, the first link 26 and the second link 29 may also be dimensioned so that the second link 29 does not require any telescopic function in order to adjust the table board 22 into a position as illustrated in FIG. 7, which may be useful for a passenger.

In order to configure the adjusting arrangement 23 in the manner of a scissors-type linkage, two links mounted on each other at 30 are also provided, namely, a third link 31 and a fourth link 32, the third link 31 being mounted pivotably on the side cheek 24 at 33, and the fourth link 32 being mounted pivotably on the second link 29 at 34. In order to form the constrained guidance, a longitudinal groove 35 is formed in the first link 26, in which groove a guide bolt 36 fastened to the third link 31 engages. By suitable dimensioning of the individual links and by suitable positioning of their bearing points, the desired kinematics for the table board.22 may be set. When fitting for comfort, driving arrangements may be provided, with the aid of which the adjusting movements of the table board 22 may be performed by the passenger pushing a button. Driving arrangements of this type may be provided, for example, by an adjusting cylinder or by a cable pull or by a spindle drive, which engage in each case at a suitable point on the scissors-type linkage. For example, a spindle drive that interacts with the guide bolt 36 may be accommodated in the first link 26.

As illustrated in FIG. 6, the table board 22 is in a space-saving non-use position. In the example embodiment illustrated, the table board 22 is of two-part configuration and includes two halves 37, which are mounted on each other so that they may pivot about a pivot axis 38 extending transversely with respect to the longitudinal direction of the board 14. In the non-use position of the table board 22, the halves 37 are swung together in a space-saving manner, so that the halves 37 are arranged substantially congruently on each other. In addition, the kinematics of the existing arrangement 23 are selected so that the swung-together halves 37 bear against that side of the side cheek 24 or of the supporting frame 10 or of the storage box that faces away from the seat 2.

As illustrated in FIG. 7, the table board 22 is in a use position in which the table board 22 is arranged removed from the frame 6 and from the supporting frame 6 and from the floor 7. The position of the table board 22 is selected for its use position so that a passenger sitting on the seat 3 may use the table board 22. The adjusting arrangement 23 is configured so that any desired intermediate position for the setting of the table board 22 may be achieved. This may be achieved, for example, by a self-locking driving element, for example, a spindle drive. In the use position illustrated in FIG. 7, the two halves 37 of the table board 22 are swung apart, with the result that they substantially form a plane. The inclination of the table board 22 may be set, in which case the table board 22 is mounted so that it may rotate, for example, about the pivot axis 38.

The adjusting arrangement 23 may enable at least one intermediate position for the table board 22, in which the passenger may get into and out of the vehicle comfortably. In this case, provision may be made to keep the inclination of the table board 22 substantially constant, for example, with the aid of a corresponding parallel link arrangement, which increases the utility value of this table board 22.

What is claimed is:

1. A foot-depositing arrangement for a passenger sitting in one of a rear seat and a passenger seat of a vehicle, comprising:
   a board having a surface;
   an adjusting device;
   a frame arranged on a floor in front of the seat and supporting the board via the adjusting device;
   wherein the adjusting device is configured to set a first board position in which the surface of the board forms a ramp rising with increasing distance from the seat and in which the surface of the board is configured to receive feet of the passenger; and
   wherein the adjusting device is configured to set a second board position in which the surface of the board forms one of a ramp sloping away with increasing distance from the seat and a substantially horizontal receptacle and in which the surface of the board is configured to receive calves of the passenger.

2. The foot-depositing arrangement according to claim 1, wherein the adjusting device is configured to set a distance between the board and the seat.

3. The foot-depositing arrangement according to claim 1, further comprising a supporting frame, the board mounted with its lower side on the supporting frame, the adjusting device engaging the supporting frame.

4. The foot-depositing arrangement according to claim 3, wherein the supporting frame is configured as a storage box, the board forming a cover of the storage box and mounted on the supporting frame pivotably about a pivot axis extending transversely with respect to a longitudinal direction of the board.

5. The foot-depositing arrangement according to claim 4, wherein the storage box has a wedge-shaped cross-section with respect to the longitudinal direction of the board.

6. The foot-depositing arrangement according to claim 4, wherein the storage box is removably connected to the adjusting device.

7. The foot-depositing arrangement according to claim 6, wherein the storage box is configured as a portable case.

8. The foot-depositing arrangement according to claim 1, wherein the board is configured to be length adjustable in a direction of a distance between the seat and the frame.

9. The foot-depositing arrangement according to claim 3, wherein the board is arranged on the supporting frame adjustable with respect to a longitudinal direction.

10. The foot-depositing arrangement according to claim 3, wherein the board is divided with respect to a longitudinal direction into a first board part and a second board part, the first board part facing away from the seat and mounted on the supporting frame pivotably about a pivot axis that extends transversely with respect to the longitudinal direction of the board, the second board part facing the seat, in the second board position the first board forming a foot rest that is adjustable between a swung-down passive position, in which the first board forms a planar extension of the second board part, and a swung-up active position, in which the first board part protrudes from the supporting frame approximately perpendicularly with respect to the second board part.

11. The foot-depositing arrangement according to claim 1, wherein the frame is fixed to the floor of the vehicle.

12. The foot-depositing arrangement according to claim 1, wherein the adjusting device is configured to adjust an inclination of the ramp in at least one of the first board position and the second board position.

13. The foot-depositing arrangement according to claim 1, wherein a distance between the board and the seat is smaller in the second board position than in the first board position.

14. The foot-depositing arrangement according to claim 1, wherein a transverse edge of the board facing the seat in the second board position is configured to be arranged approximately flush with an upper transverse edge of a seat cushion of the seat facing the board.

15. The foot-depositing arrangement according to claim 1, wherein the adjusting device includes a driver arrangement operable in accordance with a push of a button.

16. The foot-depositing arrangement according to claim 1, further comprising a table board adjustable by an adjusting arrangement between a non-use position and a use position, the table being arranged in a space-saving manner on the foot-depositing arrangement in the non-use position and being removed from the frame and arranged in a usable manner for the passenger in the use position.

17. The foot-depositing arrangement according to claim 16, wherein the table board includes two halves mounted swingably against each other, the halves being swung together and arranged substantially congruently on each other in the non-use position, the halves being swung apart and substantially forming a plane in the use position.

18. The foot-depositing arrangement according to claim 17, wherein in the non-use position, the swung-together halves bear against the foot depositing arrangement on a side facing away from the seat.

19. The foot-depositing arrangement according to claim 16, wherein the adjusting arrangement includes a scissor linkage configured to adjust the table board in a constrained manner in a predetermined path of movement.

20. The foot-depositing arrangement according to claim 16, wherein the adjusting arrangement includes a driver arrangement operable in accordance with a push of a button.

21. The foot-depositing arrangement according to claim 16, wherein the adjusting arrangement engages on a floor side of one of the frame and the supporting frame.

* * * * *